United States Patent
Zhang

(10) Patent No.: US 12,506,630 B2
(45) Date of Patent: Dec. 23, 2025

(54) COMMUNICATION METHOD AND USER EQUIPMENT

(71) Applicant: JRD COMMUNICATION (SHENZHEN) LTD., Guangdong (CN)

(72) Inventor: Xin Zhang, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 327 days.

(21) Appl. No.: 18/259,614

(22) PCT Filed: Dec. 30, 2020

(86) PCT No.: PCT/CN2020/141180
§ 371 (c)(1),
(2) Date: Jun. 28, 2023

(87) PCT Pub. No.: WO2022/141139
PCT Pub. Date: Jul. 7, 2022

(65) Prior Publication Data
US 2024/0080218 A1 Mar. 7, 2024

(51) Int. Cl.
*H04L 12/18* (2006.01)
*H04W 76/27* (2018.01)

(52) U.S. Cl.
CPC ........ *H04L 12/1886* (2013.01); *H04L 12/189* (2013.01); *H04W 76/27* (2018.02)

(58) Field of Classification Search
CPC .............................. H04W 76/27; H04L 12/189
See application file for complete search history.

(56) References Cited

U.S. PATENT DOCUMENTS

| | | | |
|---|---|---|---|
| 2017/0126853 A1* | 5/2017 | Goel | H04L 69/22 |
| 2018/0331875 A1* | 11/2018 | Abedini | H04W 8/245 |
| 2019/0174571 A1* | 6/2019 | Deenoo | H04W 76/27 |
| 2019/0191483 A1* | 6/2019 | Ryoo | H04W 52/0229 |
| 2019/0380088 A1* | 12/2019 | Takano | H04W 68/12 |
| 2020/0037345 A1* | 1/2020 | Ryoo | H04W 74/0833 |
| 2021/0045181 A1* | 2/2021 | Li | H04W 72/23 |
| 2021/0064757 A1* | 3/2021 | Nabar | G06F 13/28 |
| 2021/0266827 A1* | 8/2021 | Frenger | H04L 12/12 |
| 2022/0046503 A1* | 2/2022 | Kumar | H04W 28/24 |

(Continued)

FOREIGN PATENT DOCUMENTS

| | | |
|---|---|---|
| CN | 102651849 A | 8/2012 |
| CN | 109565896 A | 4/2019 |

(Continued)

OTHER PUBLICATIONS

International Search Report in International application No. PCT/CN2020/141180,mailed on Jun. 23, 2021.

(Continued)

*Primary Examiner* — Douglas B Blair
(74) *Attorney, Agent, or Firm* — PV IP PC; Wei Te Chung

(57) ABSTRACT

A communication method applied at a user equipment side includes receiving configuration parameters of a broadcast multicast service, wherein the configuration parameters comprise quality of service parameters, if a user equipment is in an idle state or an inactive state, then performing state transition to transition to a connected state and receiving the broadcast multicast service in the connected state.

6 Claims, 3 Drawing Sheets

(56) References Cited

U.S. PATENT DOCUMENTS

| | | | |
|---|---|---|---|
| 2022/0070876 A1* | 3/2022 | Bangolae | H04W 4/40 |
| 2022/0312275 A1* | 9/2022 | Van Phan | H04W 28/24 |
| 2023/0164773 A1* | 5/2023 | Alfarhan | H04W 74/0833 370/329 |
| 2023/0180343 A1* | 6/2023 | Park | H04W 76/14 |
| 2023/0379860 A1* | 11/2023 | Rao | H04W 64/00 |

FOREIGN PATENT DOCUMENTS

| | | |
|---|---|---|
| CN | 110753387 A | 2/2020 |
| WO | 2014183279 A1 | 11/2014 |

OTHER PUBLICATIONS

Written Opinion of the International Search Authority in International application No. PCT/CN2020/141180, mailed on Jun. 23, 2021.

Huawei. "Summary of [AT112-e][036][MBS] SA2 LS on MBS" 3GPP TSG-RAN WG2 Meeting #112-e R2-2011022, Nov. 16, 2020(Nov. 16, 2020), p. 20 first line-last line.

Qualcom Incorporated. "Discussion on Broadcast/Multicast for RRC_IDLE and RRC_INACTIVE UEs" 3GPP TSG RAN WG1 #103-e R1-2009276 Nov. 1, 2020(Nov. 1, 2020) whole documents.

Moderator BBC. "Summary #3 on RAN Basic Functions for Broadcast/Multicast for UEs in RRC_IDLE/RRC_INACTIVE States" 3GPP TSG RAN WG1 #103-e R1-2009554, Nov. 14, 2020(Nov. 14, 2020) p. 3 first line-last line.

European Search Report in European application No. 20967486.0, mailed on Aug. 14, 2024.

CATT: "Consideration on Idle and Inactive mode UEs", 3GPP Draft; R2-2006597, Aug. 7, 2020, XP051911532.

Chinese Office Action issued in corresponding Chinese Patent Application No. 202080108293.9 dated Jun. 21, 2024, pp. 1-7.

* cited by examiner

COMMUNICATION METHOD AND USER EQUIPMENT

CROSS REFERENCE TO RELATED APPLICATIONS

This application is a US national phase application based upon an International Application No. PCT/CN2020/141180, filed on Dec. 30, 2020, and entitled "COMMUNICATION METHOD AND USER EQUIPMENT". The entire disclosures of the above application are incorporated herein by reference.

TECHNICAL FIELD

The disclosed embodiments of the present invention relate to the technical field of communication, in particular to a communication method and a user equipment.

BACKGROUND

Multimedia Broadcast Multicast Service (MBMS) of LTE provides two service types: broadcast and multicast. When the MBMS service is a broadcast service, the MBMS service is sent to all user equipment in the form of broadcast, the user equipment may not actually receive the broadcast service unless local activation is performed. When the user equipment needs to receive the broadcast service, the user equipment only needs to tune to the corresponding channel according to a parameter description in a service information to receive data. Therefore, the broadcast service has no requirement on the state of the user equipment and can be received in an idle state or an inactive state.

However, in the current 5G new air interface technology, there may be some business types that require high quality of service parameters, such as vehicle to everything (V2X). The traditional MBMS business model is not well compatible to support the type of business.

Therefore, it is necessary to propose a communication protocol to define a user equipment for receiving a broadcast multicast service in 5G new air interface technology.

SUMMARY OF INVENTION

According to the embodiment of the present invention, the present invention proposes a communication method to solve the technical problem that the traditional MBMS service mode cannot be compatible with supporting service types with high quality of service in the new air interface technology.

According to an aspect of the present application, a communication method applied at a user equipment side includes receiving configuration parameters of a broadcast multicast service, wherein the configuration parameters comprise quality of service parameters, if the quality of service parameters are greater than a preset value and a user equipment is in an idle state or an inactive state, then performing state transition to transition to a connected state, and receiving the broadcast multicast service in the connected state.

According to another aspect of the present application, a user equipment includes a processor and a communication circuit, the processor is connected to the communication circuit, and the processor is configured to execute the above communication method.

According to another aspect of the present application, a user equipment stores instructions, and the above communication method is implemented when the instructions are executed.

The beneficial effects of the present application include that, unlike related technologies, according to the present application, the quality of service parameters of the broadcast multicast service are greater than the preset value, and when the user equipment is in an idle state or an inactive state, a state transition is performed to transition to a connected state. In this way, broadcast multicast service can be received in the connected state, reliability of smooth and timely reception by the user equipment of some service types with higher requirements on the quality of service parameters in broadcast multicast service is improved.

BRIEF DESCRIPTION OF THE DRAWINGS

In order to illustrate the technical solutions more clearly in the embodiments of the present application, the following briefly introduces the drawings that need to be used in the description of the embodiments. Apparently, the drawings in the following description are only some embodiments of the present application. For those skilled in the art, other drawings can also be obtained based on these drawings without creative effort, wherein.

DETAILED DESCRIPTION OF ILLUSTRATED EMBODIMENTS

The technical solutions in the embodiments of the present application will be clearly and completely described below in conjunction with the drawings in the embodiments of the present application. Apparently, the described embodiments are only some of the embodiments of the present application, rather than all the embodiments. Based on the embodiments in this application, all other embodiments obtained by persons of ordinary skill in the art without making creative efforts belong to the scope of protection of the present application.

Figure 1:
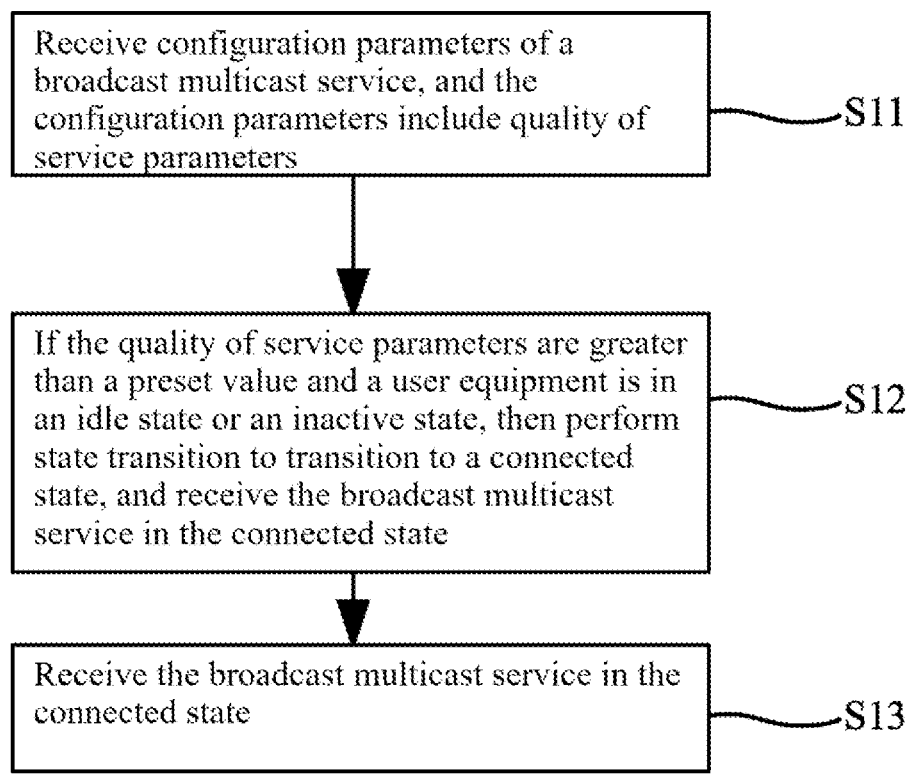
FIG. 1 is a schematic flowchart of a communication method according to an embodiment of the present application.

Referring to FIG. 1, FIG. 1 is a schematic flowchart of a communication method according to an embodiment of the present application.

S11: Receive configuration parameters of a broadcast multicast service, and the configuration parameters include quality of service parameters.

UE (User equipment) receives a configuration information from an upper layer. The configuration information is sent through a service declaration mechanism. The configuration information includes a bearer type used by the broadcast multicast service, including media description, such as video type, sound coding, and session description, such as service identifier, IP multicast address, and playing time. It is understood that, the configuration information further includes Quality of Service (Qos) parameters.

Quality of service parameters may include 5QI (5G Quality identity), ARP, reflective QoS attribute (RQA), guaranteed flow bit rate (GFBR), maximum flow bit rate (MFBR), indication control, and maximum packet loss rate.

The QoS level of 5G is defined as follows:

TABLE 1

| 5QI value | Resource type | Default priority | Packet maximum delay | Packet error rate | Default averaging window | Service example |
|---|---|---|---|---|---|---|
| 1 | GBR NOTE 1 | 20 | 100 ms | $10^{-2}$ | 2000 ms | Voice session |
| 2 | | 40 | 150 ms | $10^{-3}$ | 2000 ms | Video session |
| 3 | | 30 | 50 ms | $10^{-3}$ | 2000 ms | Real-time game, V2X message, distribution medium voltage, automatic monitoring process |
| 4 | | 50 | 300 ms | $10^{-6}$ | 2000 ms | Non-video session (buffered stream) |
| 65 | | 7 | 75 ms | $10^{-2}$ | 2000 ms | Critical user airplane mode call voice (such as MCPTT) |
| 66 | | 20 | 100 ms | $10^{-2}$ | 2000 ms | Non-critical user airplane mode call voice |
| 67 | | 15 | 100 ms | $10^{-3}$ | 2000 ms | mission critical video user machine |
| 75 | | 25 | 50 ms | $10^{-2}$ | 2000 ms | V2X message |
| 5 | NON-GBR NOTE 1 | 10 | 100 ms | $10^{-6}$ | N/A | IMS signaling |
| 6 | | 60 | 300 ms | $10^{-3}$ | N/A | Voice, TCP-based (e.g., www, e-mail, P2P file sharing) |
| 7 | | 70 | 100 ms | $10^{-2}$ | N/A | Voice, video (live stream), interactive game |
| 8 | | 80 | 300 ms | $10^{-6}$ | N/A | Video (buffered stream), |
| 9 | | 90 | | | N/A | TCP-based (e.g., www, e-mail, P2P file sharing) |
| 69 | | 5 | 60 ms | $10^{-6}$ | N/A | Mission-critical delay-sensitive signaling (such as MC-PTT signaling) |
| 70 | | 55 | 200 ms | $10^{-6}$ | N/A | Critical mission data |
| 79 | | 65 | 50 ms | $10^{-2}$ | N/A | V2X message |
| 80 | | 68 | 10 ms | $10^{-6}$ | N/A | Low-latency eMBB application enhancement |

TABLE 1-continued

| 5QI value | Resource type | Default priority | Packet maximum delay | Packet error rate | Default averaging window | Service example |
|---|---|---|---|---|---|---|
| 81 | latency critical | 11 | 5 ms | $10^{-5}$ | 2000 ms | Remote control |
| 82 | GBR | 12 | 10 ms NOTE5 | $10^{-5}$ | 2000 ms | Intelligent transmission system |
| 83 | | 13 | 20 ms | $10^{-5}$ | 2000 ms | Intelligent transmission system |
| 84 | | 19 | 10 ms | $10^{-4}$ | 2000 ms | Discrete automation |
| 85 | | 22 | 10 ms | $10^{-4}$ | 2000 ms | Discrete automation |

It can be seen from Table 1 that for different service types, the delay parameters, reliability parameters and priority levels are different, and the Qos levels are also different.

S12: If the quality of service parameters are greater than a preset value and a user equipment is in an idle state or an inactive state, then perform state transition to transition to a connected state, and receive the broadcast multicast service in the connected state.

According to the above table, it can be seen that for different service types, the delay parameters, reliability parameters and priority levels are different, and the QoS levels are also different. Services such as intelligent transmission systems with relatively high QoS levels, V2X messages, and low-latency eMBB for application enhancement have stricter requirements on delay and reliability than other services with lower QoS levels.

The connected state of the UE means that an RRC (Radio Resource Control,) connection exists between the UE and the base station. The UE needs to notify NG-RAN when moving in the RNA (Radio access net, radio access network) area.

The idle state of the UE means that there is no RRC connection between the UE and the base station, and there is no RRC context of the UE. There is also no NAS (Non-access-stratum) connection between the UE and the core network. However, because the UE registers with AMF (Access and Mobility Management function) of the core network, there is a context in the AMF.

The inactive state of the UE means that the UE remains in the CM (Connection management) connection state, and the UE does not notify NG-RAN (5G Radio Access Network) when the UE moves in the RNA area. The last serving base station reserves the context of the UE and the 5G connection of the AMF and UPF (User Port Function) associated with the UE. The connection between the UE and the core network is still maintained.

In this embodiment, the Qos parameters may include reliability parameters and delay parameters. The Qos parameter is greater than the preset value, that is, the higher the Qos level, the lower the immediate delay and bit error rate can be seen from the above table. For example, in the V2X Internet of Vehicles service, in order to realize data transmission in a high-speed mobile environment, there are high requirements on transmission delay and reliability. The preset value of the Qos parameters can be characterized by delay or reliability. Assuming that the preset value of the delay parameters at this time is 60 ms, and the delay parameter in the V2X Internet of Vehicles service is 50 ms, then the delay of such services has stricter requirements than the preset value. Further, there is also a requirement on the state of the UE, and the UE needs to perform data transmission in the connected state. That is, only when the RRC connection between the UE and the base station and the NAS connection of the core network are normal, the MBS service with high Qos requirements can be received.

S13: Receive the broadcast multicast service in the connected state.

After the UE transitions to the connected state, the UE switches to the corresponding channel to receive broadcast multicast service according to the parameters in the configuration information, such as the service address.

According to the present application, the quality of service parameters of the broadcast multicast service is greater than the preset value, and when the user equipment is in the idle state or the inactive state, the state transition is performed to switch to the connected state. In this way, the broadcast multicast service can be received in the connected state. Therefore, the reliability of smooth and timely reception by the user equipment of some service types with higher requirements on the quality of service parameters in the broadcast multicast service is improved.

In an embodiment, after receiving the configuration parameters of the broadcast multicast service, the method further includes: if the quality of service parameters are less than or equal to the preset value, then receiving the broadcast multicast service directly without performing the state transition.

When the quality of service parameters in the configuration information is less than or equal to the preset value, or the quality of service parameters are not configured in the upper layer configuration message. For example, the traditional mobile TV service has low requirements on delay and reliability. Then, the UE can directly receive the broadcast multicast service in any state of idle state, inactive state, or connected state.

Specifically, according to the above table, it can be seen that the Qos parameters are smaller than the preset value, that is, the lower the Qos level is. It can be seen from the above table that the higher the value of delay and bit error rate is. For example, in voice conversation services, the requirements for transmission delay and reliability parameters are relatively low. The preset value of the Qos parameters can be characterized by delay or reliability. Assuming that the preset value of the delay parameter is 60 ms, and the delay parameter in the voice conversation service is 100 ms, then the delay of this type of service has a reserved range relative to the preset value. In addition, there is no requirement on the state of the UE, and the UE can directly receive the broadcast multicast service in any state of idle state, inactive state, or connected state.

Specifically, broadcast multicast service mainly includes a broadcast service and a multicast service. The broadcast service is sent to the UE in a broadcast manner rather than at the UE's will. Unless the UE performs local activation, the UE may not actually receive the broadcast service.

However, the multicast service may only be transmitted to UEs that have been authorized and have completed the joining process. The UE obtains the authorization of the multicast service by subscribing, and the corresponding UE information may be saved by the upper layer. After the UE initiates the service, the UE needs to pass the authorization of the upper layer to complete the joining process in the bearer network and save the UE information in the corresponding multicast relationship of the relevant node, so that the UE can receive the multicast service. When the UE terminates the service, the UE triggers the leave process of the bearer network and stops accepting the service data.

To sum up, for broadcast multicast services, according to different quality of service parameters, there may be the following situations:

Broadcast multicast services include broadcast services and multicast services. There are high requirements on the QoS parameters of all multicast services. It is required that the UE needs to enter the connected state to receive all multicast services and cannot receive all multicast services in the idle state or inactive state. All broadcast services can be received in an idle state or an inactive state.

Broadcast multicast services include broadcast services and multicast services. For some multicast services that have high requirements on quality of service parameters, the UE needs to enter the connected state to receives this part of multicast services. For other multicast services, the UE can receive the other multicast services in idle state or inactive state, and for all broadcast services, the UE can receive the all broadcast services in idle state or inactive state.

Broadcast multicast services include broadcast services and multicast services. All multicast services have higher quality of service parameters, requiring that the UE needs to enter the connected state to receive the multicast service, and the UE cannot receive the multicast service in the idle state or the inactive state. For some broadcast services with higher requirements on QoS parameters, the UE also needs to receive this part of broadcast services in the connected state. For other broadcast services, the UE can receive the other broadcast services in an idle state or an inactive state.

Broadcast and multicast services include broadcast services and multicast services. Some multicast services that have higher requirements on quality of service parameters. It is required that the UE needs to enter the connected state to receive this part of the multicast services. For other multicast services, the UE can receive the other multicast services in idle state or inactive state. For some broadcast services with higher requirements on QoS parameters, the UE also needs to receive this part of broadcast services in the connected state. For other broadcast services, the UE can receive the other broadcast services in an idle state or an inactive state.

In an embodiment, after receiving the broadcast multicast service in the connected state, the method further includes: if there is no data transmission in the broadcast multicast service within a specific time, the user equipment performs state transition to transition to the idle state and/or the inactive state.

The broadcast multicast service includes a broadcast service and a multicast service. The initial state of the UE is connected state to receive the broadcast service. During a certain period of time, the UE does not receive data transmission. For example, within the preset time when the UE is ready to receive or the UE has finished receiving the previous batch of data, this preset time is defined by the UE. At this time, the UE can perform state transition to the idle state or inactive state for the broadcast service and can also perform state transition to the idle state or inactive state for the multicast service. It is understood that, for this situation, the trigger condition for the UE to enter the idle state or the inactive state also needs to be considered. For example, if the UE is receiving other unicast services at this time, the UE cannot enter the idle state or the inactive state.

In this embodiment, the state transition of the user equipment to transition to the idle state or the inactive state also includes the following situations:

The broadcast multicast service includes a broadcast service and a multicast service. The UE can perform a state transition to an idle state or an inactive state for a broadcast service. The UE can transition to the idle state for the multicast service but cannot transition to the inactive state.

The broadcast multicast service includes a broadcast service and a multicast service. The UE can perform a state transition to an idle state or an inactive state for a broadcast service. The UE can transition to the inactive state for the multicast service but cannot transition to the idle state.

he broadcast multicast service includes a broadcast service and a multicast service. The UE can perform a state transition to an idle state or an inactive state for the broadcast service. The UE cannot perform state transition to the idle state or the inactive state for the multicast service.

In an embodiment, if the user equipment is in the idle state or the inactive state, then performing the state transition to transition to the connected state further includes: the user equipment receiving a paging message from a core network and/or a base station, thereby initiating a radio resource control connection transition to the connected state.

Figure 2:
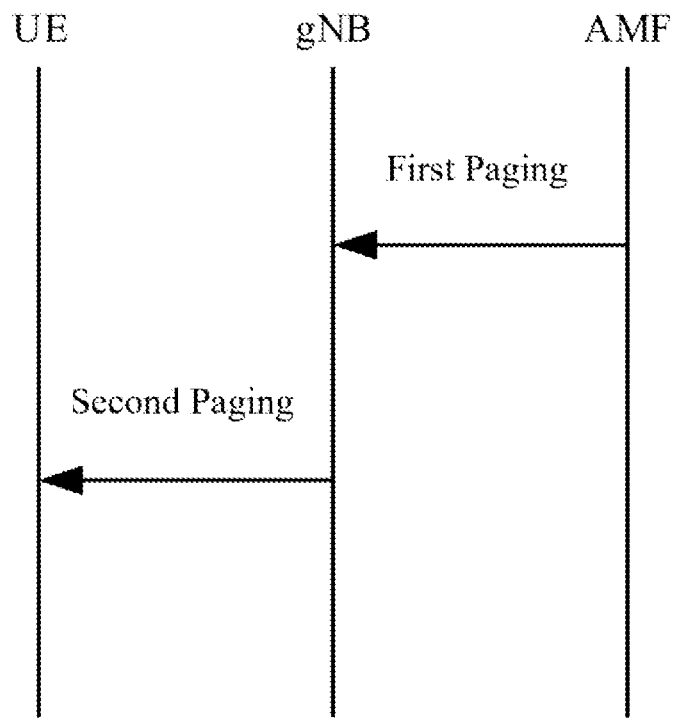
FIG. 2 is a schematic flowchart of a core network paging in a communication method according to an embodiment of the present application.

Specifically, refer to FIG. 2, which shows CN (Core net, core network) paging when the UE is in an idle state. When the UE is in an idle state, there is no RRC connection between the UE and the base station (gNB), and there is no NAS connection between the UE and the core network. However, the UE has been assigned a unique representation in the TA (Track area) where it is located. The UE is already registered with AMF and context exists in AFM. When the core network needs to send downlink data or downlink NAS signaling to the UE in CM idle state, the AMF may send the first paging message to all base stations in all TAs registered by the UE. The base station that receives the first paging message from the core network sends a second paging message through the air interface to page the UE. After receiving the second paging message, the UE in the idle state may initiate an RRC connection establishment process to receive downlink data.

Figure 3:
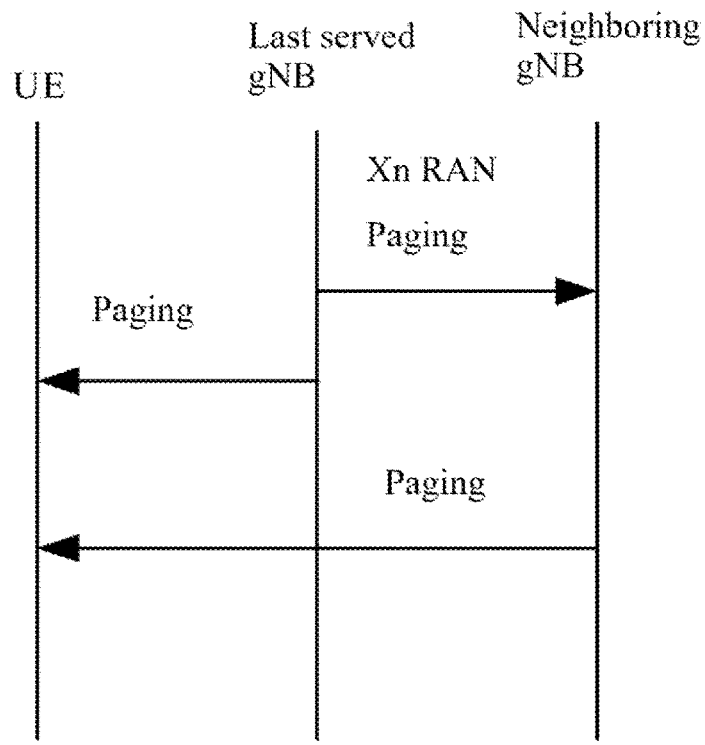
FIG. 3 is a schematic flowchart of a radio access network paging in a communication method according to an embodiment of the present application.

Refer to FIG. 3, which shows RAN paging when the UE is in an inactive state. When the UE is in an inactive state, the UE and the base station maintain the RRC context. However, the RRC connection between the UE and the base station is suspended, and the UE and the core network are in a CM connection state. When the core network sends downlink data to the UE in the inactive state, the core network needs to page the UE in the inactive state. Further, the core network considers that the UE is in a connected state, so a node of the radio access network, such as a base station, initiates paging.

The last base station node serving the UE may save the UE context and maintain the connection with the core network. If the last base station serving the UE receives downlink data or UE-related downlink NAS signaling from the core network when the UE is in an inactive state, the base station may page the UE on all cells included in the radio access network to which the UE belongs. If the radio access network includes a cell on a neighboring base station, the base station may send an XnAP RAN paging message to the neighboring base station to notify the base station to page the UE on the corresponding cell. After receiving the RAN paging message, the UE in the inactive state may send an RRC connection reply process to receive downlink data. The RAN here is a RAN-based notification area managed by the NG-RAN, and the NG-RAN knows the RAN mentioned by the UE.

As in the above CN paging process and RAN paging process, when the UE is in an idle state, it can only support CN paging, but when the UE is in an inactive state, it supports both CN paging and RAN paging.

It is understood that, when the above-mentioned paging message received from the core network and/or base station is used to initiate the RRC connection transition to the connected state, auxiliary information needs to be added to the paging message, and the auxiliary information may include:

A transmission mode sent by the 5G core network to the base station for auxiliary decision-making. For example, the 5G core network directly informs the base station that the transmission mode adopted is point-to-multipoint transmission and/or point-to-point transmission.

Broadcast multicast service information, such as TMGI (Temporary Mobile Group Identity).

Session start time and session termination time of the broadcast multicast service.

Quality of service parameters from the core network for the broadcast multicast services include the above-mentioned delay parameters and reliability parameters, wherein the quality of service parameters may include 5QI, ARP, reflective Qos attributes, guaranteed flow bit rate (GFBR), and maximum flow bit rate (MFBR), indication control, and maximum packet loss rate.

In another embodiment, if the user equipment is in the idle state or the inactive state, then performing the state transition to transition to the connected state further includes: receiving a change notification configured from a network side notifying the user equipment to enter the connected state, thereby initiating a radio resource control connection transition to the connected state.

Specifically, in the broadcast multicast service, when the configuration of the service changes, the network side may send a change notification to the UE. In broadcast multicast services, some services with higher requirements on the quality of service parameters can only be received when entering the connected state. At this time, the base station may send a change notification to the UE, where the change notification includes updated configuration information. The change notification includes, for example, a message notifying the UE to perform a state transition to the connected state. The change notification also includes related service information of the broadcast multicast service, such as TMGI. The change notification may also include all or part of the information related to the paging message.

Figure 4:
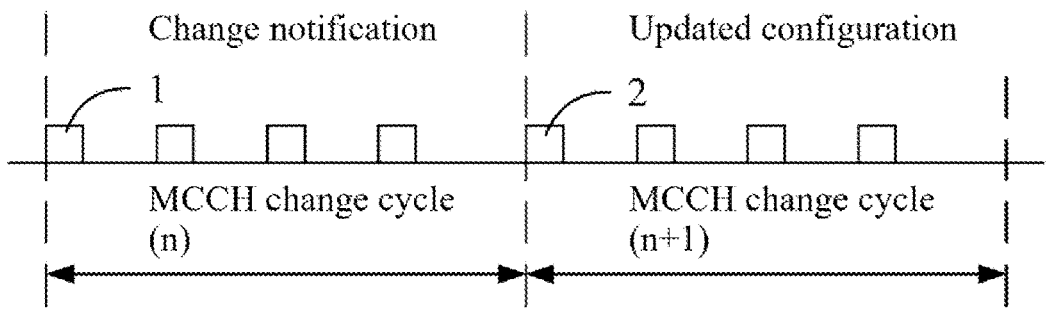
FIG. 4 is a schematic diagram of receiving a change notification in a communication method according to an embodiment of the present application.

Referring to FIG. 4, the base station sends a change notification to the UE, informing the UE that it needs to read configuration information again in the next system change cycle. Once the UE receives the change notification, the UE may start to obtain the updated configuration information at the beginning of the next change cycle. Before the UE decodes the new configuration information, the UE needs to continue to use the original configuration information. As shown in FIG. 4, in the change period n, the UE receives the change notification. However, the configuration information at this time is still the original configuration information, that is, the identification block 1 in the figure. In the next system change period (n+1), the UE starts to receive updated configuration information, that is, block 2 in the figure. The change notification can be sent in the fixed subframe of the broadcast multicast service data, so as to facilitate the UE to monitor. After receiving the change notification, the UE can initiate an RRC connection establishment request and enter the connected state.

Figure 5:
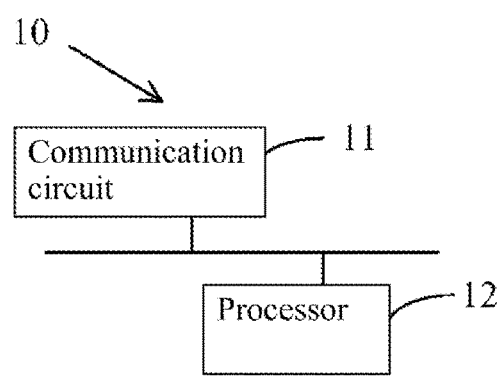
FIG. 5 is a schematic structural diagram of a user equipment in a communication method according to an embodiment of the present application.

Referring to FIG. 5, FIG. 5 is a schematic structural diagram of a user equipment according to an embodiment of the present application. The user equipment 10 includes a processor 12 and a communication circuit 11. The processor 12 is connected to the communication circuit 11, and the processor 12 is used to execute instructions to implement the above communication method.

The processor 12 may also be referred to as a CPU (Central Processing Unit). The processor 12 may be an integrated circuit chip with signal processing capabilities. The processor 12 can also be a general-purpose processor, a digital signal processor (DSP), an application-specific integrated circuit (ASIC), a field-programmable gate array (FPGA) or other programmable logic devices, discrete gate or transistor logic devices, discrete hardware components. The general purpose processor may be a microprocessor or the processor 12 may be any conventional processor or the like.

Figure 6:
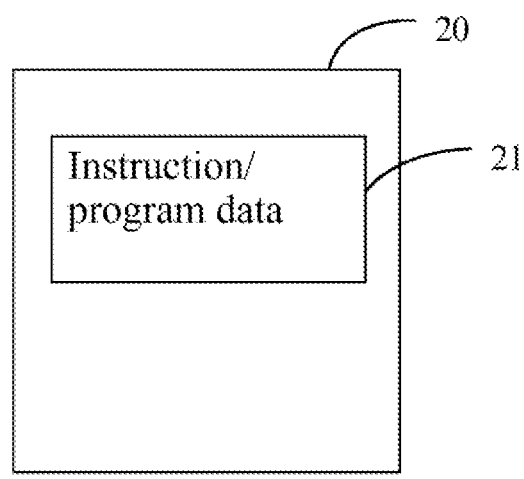
FIG. 6 is a schematic diagram of a storage of a user equipment in a communication method according to an embodiment of the present application.

Referring to FIG. 6, FIG. 6 is a schematic diagram of a storage of a user equipment according to an embodiment of the present application. A storage medium 20 of the user equipment in the embodiment of the present application stores instruction/program data 21. When the instruction/program data 21 is executed, the method provided by any embodiment of the communication method of the present application and any non-conflicting combination is realized. The instruction/program data 21 can form a program file and be stored in the above-mentioned storage medium 20 in the form of a software product, so that a computer device (which can be a personal computer, a server, or a network device, etc.) or a processor (processor) executes all or part of the steps of the methods in the various implementation manners of the present application. The aforementioned storage medium 20 includes U disk, mobile hard disk, read-only memory (ROM), random access memory (RAM), magnetic disk or optical disk and other media that can store program codes, or terminal device such as computer, server, mobile phone, and tablet.

In the several embodiments provided in the present application, it should be understood that the disclosed system, device, and method can be implemented in other ways. For example, the device embodiments described above are illustrative only. For example, the division of units is only a logical function division, and there may be another division method in actual implementation. For example, several units or components may be combined or may be integrated into another system, or some features may be omitted, or not implemented. In another point, the mutual coupling or direct coupling or communication connection shown or discussed may be through some interfaces, and the indirect coupling or communication connection of devices or units may be in electrical, mechanical or other forms.

In addition, each functional unit in each embodiment of the present application may be integrated into one processing unit, each unit may exist separately physically, or two or more units may be integrated into one unit. The above-mentioned integrated units can be implemented in the form of hardware or in the form of software functional units.

The above are only the implementation manners of the present application and are not intended to limit the patent scope of the present application. Any equivalent structure or equivalent process transformation made by using the contents of the specification and drawings of the present application, or directly or indirectly used in other related technical fields, is also included in the scope of patent protection of the present application.

What is claimed is:

1. A communication method applied at a user equipment side, comprising:
    receiving configuration parameters of a broadcast multicast service, wherein the configuration parameters comprise quality of service parameters;
    if the quality of service parameters are greater than a preset value and a user equipment is in an idle state or an inactive state, then performing state transition to transition to a connected state, wherein performing the state transition comprises receiving a paging message from a core network and/or a base station, thereby initiating a radio resource control connection transition to the connected state, and wherein the paging message comprises auxiliary information, the auxiliary information comprising a transmission mode used for auxiliary decision-making, information of the broadcast multicast service, a session start time, and the quality of service parameters from the core network; and
    receiving the broadcast multicast service in the connected state.

2. The communication method according to claim 1, wherein the broadcast multicast service comprises a broadcast service or a multicast service.

3. The communication method according to claim 1, wherein the quality of service parameters comprise reliability parameters and delay parameters.

4. A user equipment, comprising a processor and a communication circuit, wherein the processor is connected to the communication circuit;
    wherein the user equipment is configured to:
    receive configuration parameters of a broadcast multicast service, wherein the configuration parameters comprise quality of service parameters;
    if the quality of service parameters are greater than a preset value and the user equipment is in an idle state or an inactive state, the user equipment performs state transition to transition to a connected state, wherein to perform the state transition, the user equipment is configured to receive a paging message from a core network and/or a base station, thereby initiating a radio resource control connection transition to the connected state, and wherein the paging message comprises auxiliary information, the auxiliary information comprising a transmission mode used for auxiliary decision-making, information of the broadcast multicast service, a session start time, and the quality of service parameters from the core network; and
    receive the broadcast multicast service in the connected state.

5. The user equipment according to claim 4, wherein the broadcast multicast service comprises a broadcast service or a multicast service.

6. The user equipment according to claim 4, wherein the quality of service parameters comprise reliability parameters and delay parameters.

* * * * *